United States Patent
Ng et al.

(10) Patent No.: US 10,119,722 B2
(45) Date of Patent: Nov. 6, 2018

(54) FLUE ARRANGEMENT

(71) Applicants: Wilson Ng, Sydney (AU); Hiroshi Oda, Nagoya (JP)

(72) Inventors: Wilson Ng, Sydney (AU); Hiroshi Oda, Nagoya (JP)

( * ) Notice: Subject to any disclaimer, the term of this patent is extended or adjusted under 35 U.S.C. 154(b) by 225 days.

(21) Appl. No.: 15/128,934

(22) PCT Filed: Feb. 6, 2015

(86) PCT No.: PCT/AU2015/050041
§ 371 (c)(1),
(2) Date: Sep. 23, 2016

(87) PCT Pub. No.: WO2015/143496
PCT Pub. Date: Oct. 1, 2015

(65) Prior Publication Data
US 2018/0209688 A1    Jul. 26, 2018

(30) Foreign Application Priority Data
Mar. 24, 2014 (AU) ................................ 2014901039

(51) Int. Cl.
*F24H 9/00* (2006.01)
*F24H 1/14* (2006.01)

(52) U.S. Cl.
CPC ........... *F24H 1/145* (2013.01); *F24H 9/0031* (2013.01)

(58) Field of Classification Search
CPC ............................... F24H 9/0031; F24H 1/145
See application file for complete search history.

(56) References Cited

U.S. PATENT DOCUMENTS 2,877,834 A * 3/1959 Campbell ................. F23L 3/00
126/307 R
3,623,458 A * 11/1971 Block ..................... F24H 1/145
122/18.4
(Continued)

FOREIGN PATENT DOCUMENTS

GB          2422893 A     8/2006
WO     2010121287 A1    10/2010

OTHER PUBLICATIONS

International Search Report and Written Opinion dated May 19, 2015, for corresponding International Application No. PCT/AU2015/050041.

(Continued)

*Primary Examiner* — Nathaniel Herzfeld
(74) *Attorney, Agent, or Firm* — King & Spalding LLP (57) ABSTRACT

The present invention provides an outdoor water heater (10) having a lower chamber (12) located in a cabinet (14) which substantially sealingly encloses a naturally aspirated or natural draught burner 16, a combustion chamber, a heat exchanger (18), a flue (20) for conveying combustion gases from the burner (16), the flue (20) extending away from the heat exchanger (18) and passing through a middle chamber (22) located above the lower chamber (12), the flue (20) not opening into the middle chamber (22) and opening into an upper chamber (24) which has two opposed openings (24.2, 24.3), the upper chamber (24) and middle chamber (22) being substantially sealed with respect to each other to prevent combustion gas flow between the middle chamber (22) and the upper chamber (24), and wherein the middle chamber (22) has divider formations (22.1, 22.2) separating one side of the middle chamber (22) from an opposed side of the middle chamber (22), whereby the divider formations (22.1, 22.2) direct air flowing from one side of the middle chamber (22) to pass downwardly into the lower chamber (Continued)

(12) on one side then upwardly out of the lower chamber (12) to exit the middle chamber (22) on the other or opposite side.

22 Claims, 10 Drawing Sheets

(56) References Cited

U.S. PATENT DOCUMENTS

| | | | | |
|---|---|---|---|---|
| 3,691,930 A * | 9/1972 | Steinman | ................ | F23L 17/04 126/307 R |
| 3,800,748 A * | 4/1974 | Schindler | ................ | F24H 1/145 122/367.3 |
| 5,049,353 A * | 9/1991 | Conway | ................ | G21C 15/18 376/293 |
| 5,070,772 A * | 12/1991 | Guzorek | ............... | F23L 17/005 110/162 |
| 5,329,915 A * | 7/1994 | Broadbent | .............. | F24C 3/006 126/512 |
| 6,125,839 A * | 10/2000 | Elgowainy | ................ | F23C 7/00 126/85 B |
| 6,378,777 B1 * | 4/2002 | Valcic | ..................... | F24H 1/205 122/18.1 |
| 6,471,578 B1 * | 10/2002 | Yang | ....................... | F23L 17/02 454/20 |
| 6,951,191 B1 * | 10/2005 | Lin | ......................... | F24H 1/145 122/13.01 |
| 2009/0142720 A1 * | 6/2009 | Pussell | .................... | F23L 11/00 432/29 |
| 2009/0211540 A1 * | 8/2009 | Yin | ......................... | F24H 1/205 122/18.3 |
| 2010/0031900 A1 | 2/2010 | Consadori et al. | | |

OTHER PUBLICATIONS

International Search Report and Written Opinion dated May 19, 2015, for International Application No. PCT/AU2015/050041.

\* cited by examiner

FLUE ARRANGEMENT

FIELD OF THE INVENTION

The present invention relates to flue arrangements, specifically of the type for flues of natural draught or naturally aspirated outdoor gas instantaneous water heaters.

BACKGROUND OF THE INVENTION

Natural draught gas instantaneous water heater operation can be upset by draught and wind. High wind or gusts acting on the flue terminal have the potential to detrimentally affect combustion or create resistance to combustion gas flow causing improper combustion and potential damage to components.

Outdoor natural draught gas instantaneous water heaters are more subject to the effects of wind velocity and direction than indoor natural draught open flue gas instantaneous water heaters. A flue terminal of an outdoor natural draught gas instantaneous water heater will be subjected to multi-directional wind creating pressure fields acting on the flue terminal affecting air flow in and exhaust flow out. Usually an objective is to design a compact wall hung gas water heater to minimize the cost of manufacture and installation. It is thus not desirable to incorporate a long internal flue duct and draught diverter design inside the water heater so as to eliminate the multi-directional wind pressure effect.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides an outdoor water heater having a lower chamber located in a cabinet which substantially sealingly encloses a natural draught or naturally aspirated burner, a heat exchanger, a combustion chamber, a flue for conveying combustion gases from said burner, said flue extending away from said combustion chamber and or heat exchanger and passing through a middle chamber located above said lower chamber, said flue not opening into said middle chamber and opening into an upper chamber which has two opposed openings, said upper chamber and middle chamber being substantially sealed with respect to each other to prevent combustion gas flow between said middle chamber and said upper chamber, and wherein said middle chamber has divider formations separating one side of said middle chamber from an opposed side of said middle chamber, whereby said divider formations direct air flowing from one side of the middle chamber to pass downwardly into said lower chamber on one side then upwardly out of said lower chamber to exit said middle chamber on the other or opposite side.

The divider formations are located on the outside of the flue.

Flow directing formations can be located at the sides of said middle chamber.

The flow directing formations can be located at the sides of said flue. The flow directing formations can be located inside of said middle chamber.

The flow directing formation can comprise one or more than one of the following: inclined plates or panels; the upper edge of said panels can be in an upper outboard location when compared to a lower edge of said panels which are located in a lower inboard location with respect to the outer sides of said cabinet; plates or panels which are inclined with respect to one or more peripheral walls of a cabinet so as to direct air entering from a side of said water heater in a downward direction from said middle chamber to said lower chamber.

The upper, front and rear sides of said upper chamber can be closed surfaces.

The rear side of said middle chamber can be a closed surface.

The opposed openings can be partially closed by means of a grille.

The middle chamber, at an outer periphery thereof, can be partially closed by means of a grille.

The grille can be one of the following: a louvered grille; a grille of horizontal rods or bars; a grille horizontally oriented louvers; a grille of vertically oriented rods or bars; a grille of vertically oriented louvers; a grille of mesh material.

The divider formations can extend to the base of said flue.

A duct can be located at the front surface of said upper and middle chambers.

The duct can be one or more than one of the following: is vertically extending; has a generally horizontally arranged upper opening; has an upper opening above an upper plate of the upper chamber; has a generally vertically arranged lower opening; has an internal divider along a substantial part of its vertical length; the duct converges in a downward direction.

The duct can conduct air from above said upper chamber to said middle chamber.

The duct can have a vertically arranged centrally located divider, wherein one side opens into said middle chamber on one side thereof, and the other on the other side of the middle chamber.

The opposed openings on an upper panel or plate and/or side panel or plate of said upper chamber, there can be located air deflecting formations which extend across a substantial width of the upper surface of the openings. Air deflecting formations can be in the form of aerofoils for creating drag or downward force.

The air deflector formations can be at an angle of 45 degrees or less to the plane of the upper panel or plate of the upper chamber or may have an aerofoil shape.

BRIEF DESCRIPTION OF THE DRAWINGS

A detailed description of a preferred embodiment will follow, by way of example only, with reference to the accompanying Figures of the drawings, in which:

FIG. 6 illustrates an upper front perspective view of the front and left sides of the water heater of previous Figures, where main part of the upper panel or cover, the front upper side of the flue terminal and the sides of the lower cabinet are invisible or see-through for illustration purposes;

FIG. 6.1 illustrates an underneath perspective view of the water heater of FIG. 1 showing the water and gas connections;

DETAILED DESCRIPTION OF THE EMBODIMENT OR EMBODIMENTS

Figure 1:
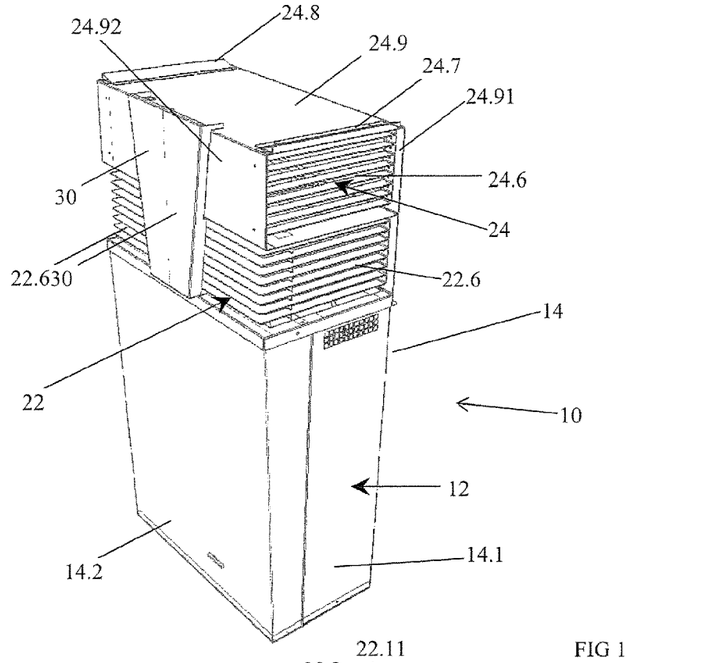
FIG. 1 illustrates a top, left side and front perspective of a natural draught outdoor gas instantaneous water heater having a flue terminal which embodies the present invention.
Figure 2:
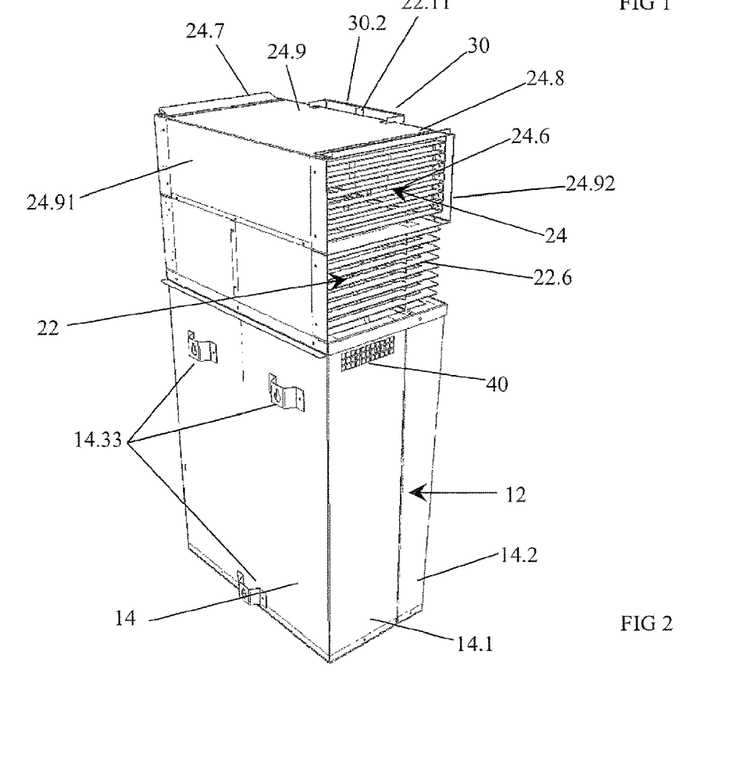
FIG. 2 illustrates a top, right side and rear perspective view of the water heater of FIG. 1.
Figure 3:
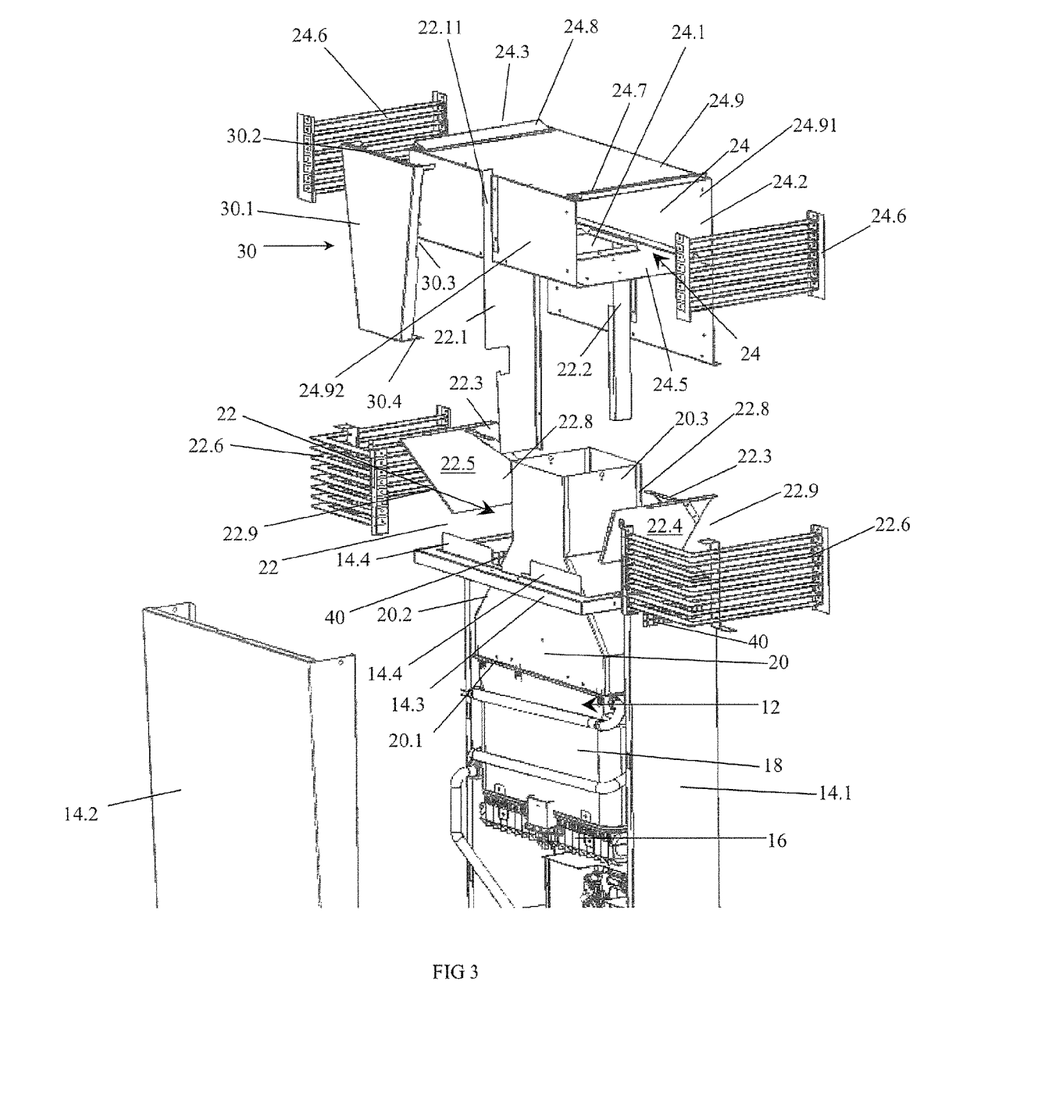
FIG. 3 illustrates an exploded upper perspective view of the upper portions of the water heater of FIG. 1.

Illustrated in FIGS. 1 to 3 is a natural draught outdoor water heater 10 having a lower chamber 12 located in a cabinet 14 having a rear side 14.1 and front side or cover 14.2 (which can be removed for maintenance or servicing and installation), which substantially sealingly encloses a burner 16 (in FIG. 3) at an intermediate location in the lower chamber 12. Above the burner 16 is located a heat exchanger 18, a periphery of which forms a combustion chamber above the burner. Above the heat exchanger is a flue 20 having a generally rectangular base opening 20.1, a converging section 20.2 and a generally square or rectangular flue outlet 20.3, for conveying combustion gases from said burner, via said heat exchanger 18. The base opening 20.1 can include sealing with respect the burner 16 upper rim, however, the buoyancy of the combustion gases can render such sealing optional.

The flue 20 extends away from the heat exchanger 18 and the upper flue portion 20.3 passes through a middle chamber 22 located above the lower chamber 12. The upper flue portion 20.3 opens into an upper chamber 24 which has two opposed openings 24.2 and 24.3, with the upper chamber 24 and middle chamber 22 being sealed and separated from each other, by the lower plate 24.5 to prevent gas flow between the middle chamber 22 and upper chamber 24. The middle chamber 22 has divider formations 22.1 and 22.2 which separate one side of the middle chamber 22 from an opposed side of the middle chamber 22, with the flue 20 in between. The divider formations 22.1 and 22.2 direct gas flowing from one side of the middle chamber 22 to pass downwardly into the lower chamber 12 on one side of the cabinet, then upwardly out of the lower chamber 12 to exit the middle chamber 22 on the other side of the cabinet, as will be explained in more detail below.

Figures 6, 61:
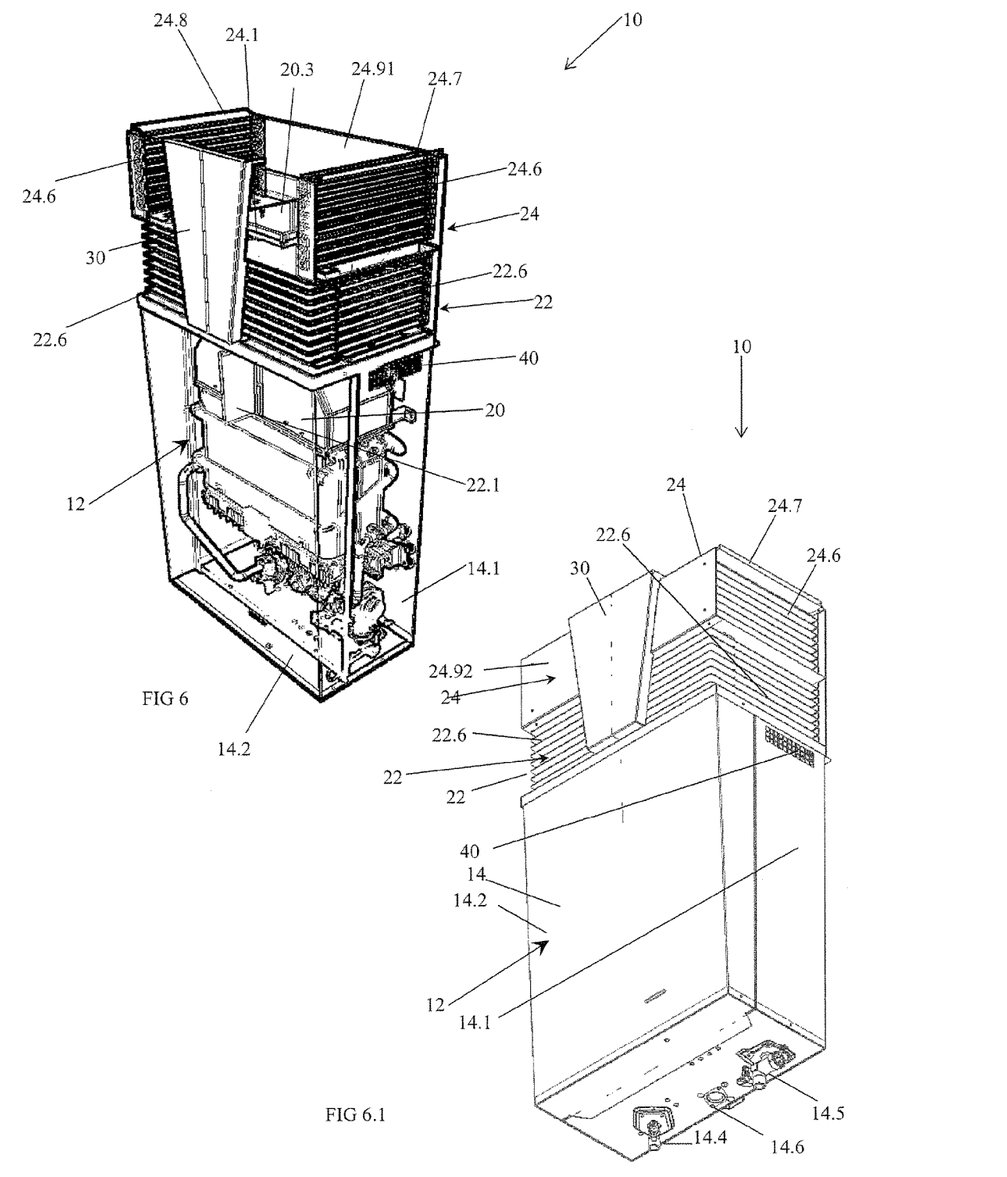
Figure 7:
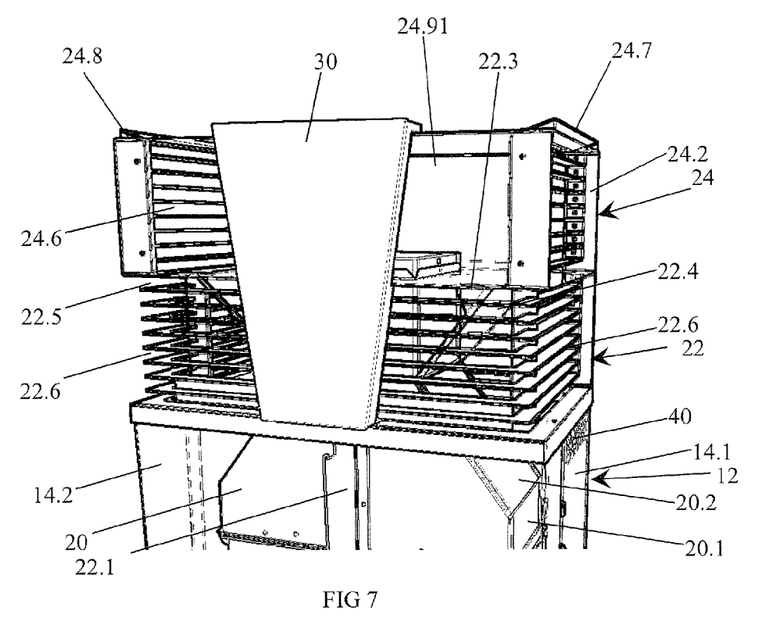
FIG. 7 illustrates a front perspective view of the flue terminal of FIG. 6.
Figure 8:
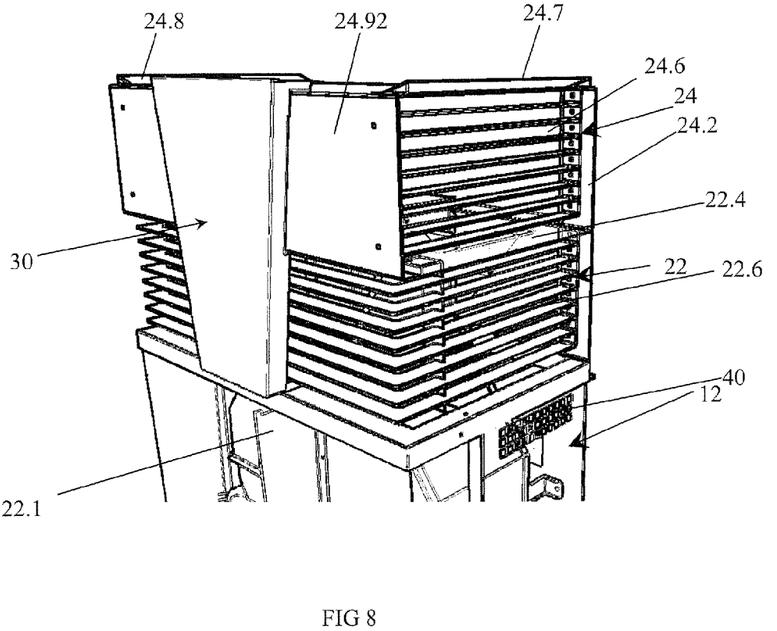
FIG. 8 illustrates a front perspective view of the front and left sides of the upper end of the lower cabinet and the flue terminal.
Figure 9:
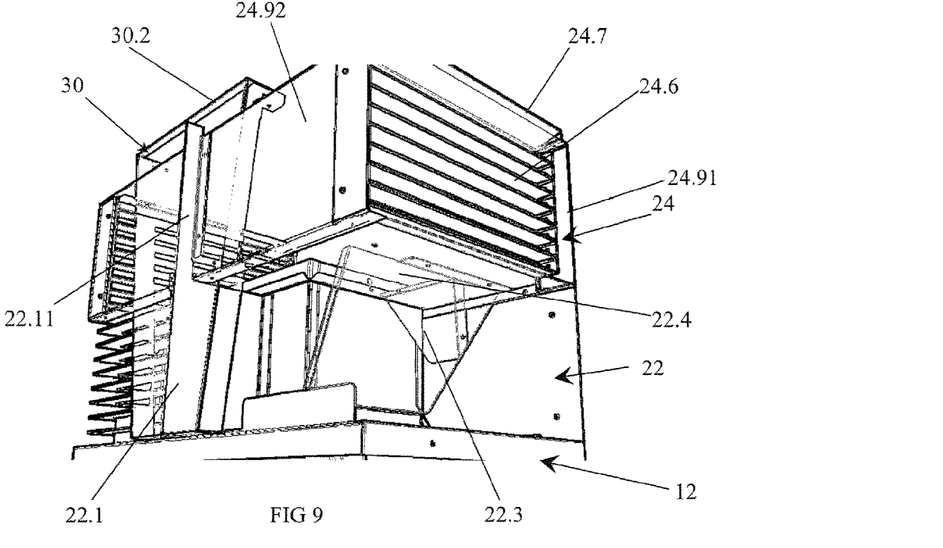
FIG. 9 illustrates a front and left side lower perspective view with the left side and part of the front side grille removed from the middle chamber showing the structures of the middle chamber—with side and front diffusers shown partially see-through to allow the shapes of components to be discerned.
Figure 10:
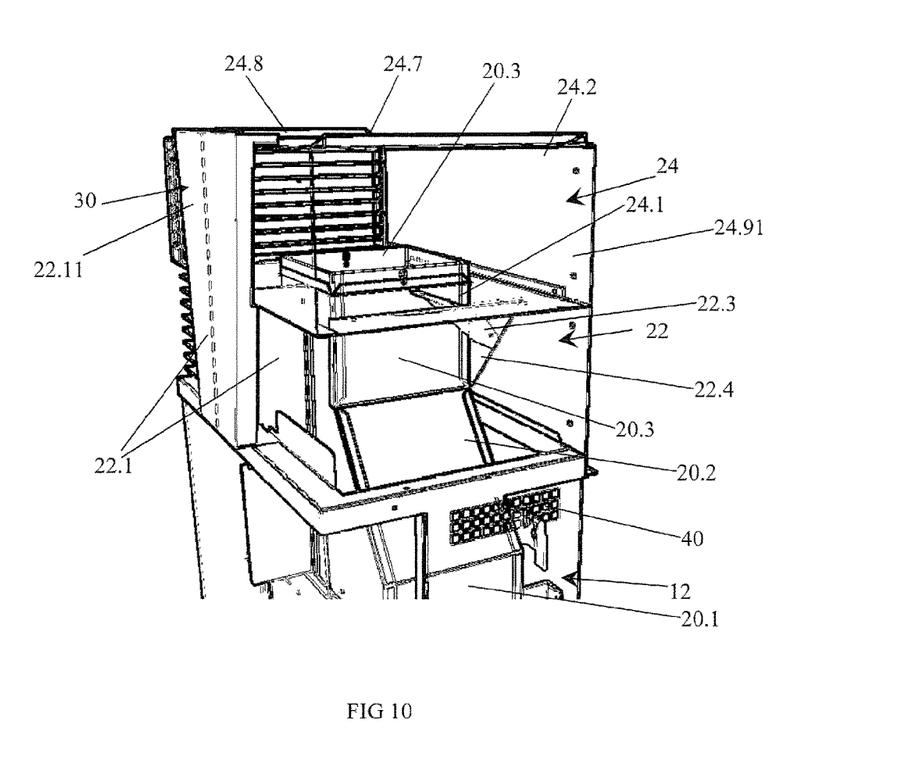
FIG. 10 illustrates the components of FIG. 9, but additionally the grilles on the left side of the upper chamber are removed to show the exhaust gas outlet of flue, and the divider between the upper and middle chambers—with side and front diffusers shown partially see-through to allow the shapes of components to be discerned.

The cabinet 14, as best illustrated in FIGS. 1, 2 and 6.1, has three mounting brackets 14.33 which allow the water heater 10 to be secured to a wall, while on the underside of the cabinet 14, on rear portion 14.1, are located a cold water inlet 14.5, a hot water outlet 14.4 and a gas inlet 14.6.

The combination of the upper chamber 22 and middle chamber 24, and the upper portion 20.3 of the flue 20 will be generally referred to as a flue terminal, with the design of these elements generally producing in use, a balanced natural draught flue.

The upper chamber 24 is in fluid flow communication/connection to upper portion 20.3 of the flue 20 and ambient air (outside of the fluid flow control boundary) via which flue gases are conveyed away from the water heater, because the upper portion 20.3 opens into the upper chamber 24, as is best illustrated in FIG. 6. The upper chamber 24 is bounded on its rear side by a closed wall 24.91, and on its upper side by a closed wall 24.9, and on its front side by a closed wall 24.92. The rear wall 24.91 is made from a panel which is of a size and shape so as to also close off the rear side of the middle chamber 22. As mentioned above, the upper chamber 24 has its lower surface generally closed off by panel 24.5, but this also includes an opening 24.1 for the upper portion 20.3 of the flue 20 to pass through.

The middle chamber 22 is in fluid flow communication/connection to ambient which allows fresh air to be drawn into the lower chamber 12 of the water heater for combustion air to be delivered to the gas burner 16. The lower chamber 12 also provides space to house the gas burner 16, heat exchanger 18, lower end rectangular end 20.1 of flue 20 as well as other water and gas control components.

The lower wall 24.5 of upper chamber 24 (being the upper wall of the middle chamber 22) acts as a divider which separates the upper chamber 24 from the middle chamber 22 so as to discourage or stop any fluid flow communication between these two chambers. Flue gases exiting the upper chamber 24 are prevented from recirculating into fresh air inlet of the middle chamber 22, as such gases are buoyant and will rise upon exiting the openings 24.2 and 24.3. The lower wall 24.5 also maintains any pressure difference between the upper chamber 24 and middle chamber 22, under the influence of wind pressure fields which may be acting around the water heater 10. Thus for most effective operation, an effective seal between aperture 24.1 in lower wall 24.5, and between the upper and middle chambers 24 and 22, can be provided. Such an effective seal can be produced by metal to metal contact of the components whether with or without the use of gasket materials and or sealant materials.

In addition to fluid flow communication with the middle chamber 22 as described above, the lower chamber 12 is of a substantially sealed construction which will assist in preventing air leakage paths, other than the fluid flow to and or from the middle chamber 22. This will assist in maintaining a balanced pressure field at the upper chamber 24 and middle chamber 22.

It should be noted, due to the assembly of the components of the upper and middle chamber 24 and 22, there is no fluid flow communication between upper chamber 24 and middle chamber 22 via the flue 20 and in particular the upper portion 20.3 of flue 20.

The water heater 10 operates on the basis of the control of fluid flow, and the direction of fluid flow, when the water heater 10 is under the effect of wind pressure fields. The following principles and mechanisms apply.

The upper chamber 24 has controlled openings 24.2 and 24.3 in fluid flow communication to ambient. The openings 24.2 and 24.3 are partially closed off and controlled by means of exhaust grilles 24.6 which partially decrease the effective open area, thus opening size and location by exhaust grilles. The grilles 24.6 are of a louvered construction (but could be of a round bar construction) so as to prevent the ingress of flying objects and creatures and essentially allows a substantially free flow, or provides a low resistance to gaseous fluid flow in either an IN or OUT direction. The flow direction depends on the pressure fields acting on the water heater which may be present due to wind, or convection currents etc.

The middle chamber 22 also has grilles 22.6, which extend in two orthogonal directions to partially close off two sides, so that the sides of the chamber 22 have controlled openings in fluid flow communication to ambient air. The opening size of the grilles 22.6, which are of a louvered construction (but could be of a round bar constructions) and are located so as to control flow of inlet air. The grilles 22.6 have the spacing between adjacent louvers sized so as to prevent the ingress of objects and creatures, and are of at least equal or larger projected opening areas than the exhaust grilles 24.6 with respective to different wind directions.

Figure 15:
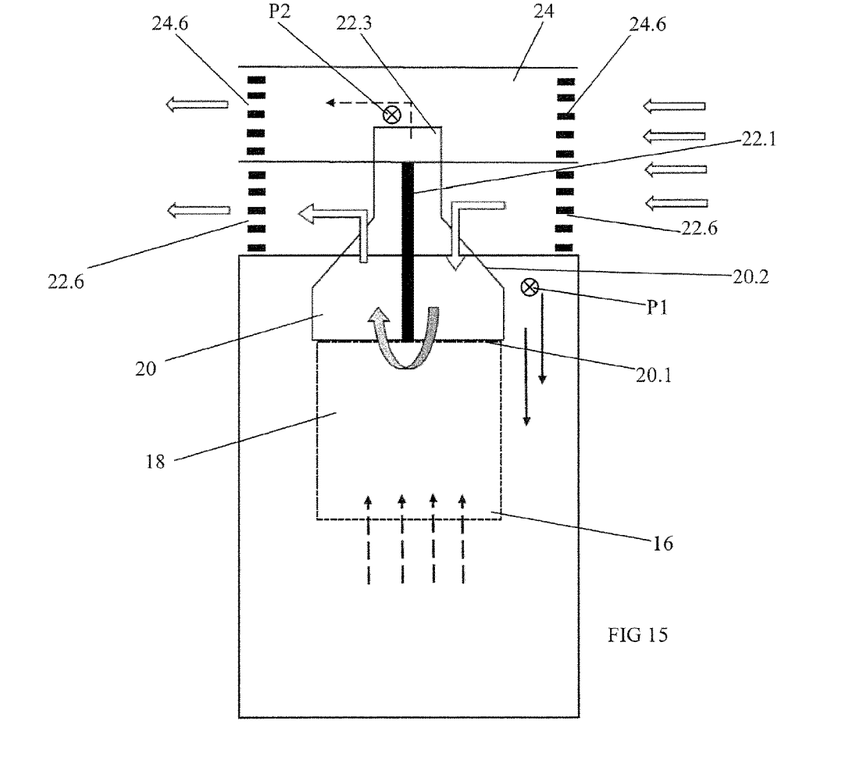
FIG. 15 illustrates a schematic of the present invention and the respective flows of wind, air flow in the lower cabinet as it passes through a generally U-shaped path.
Figure 16:
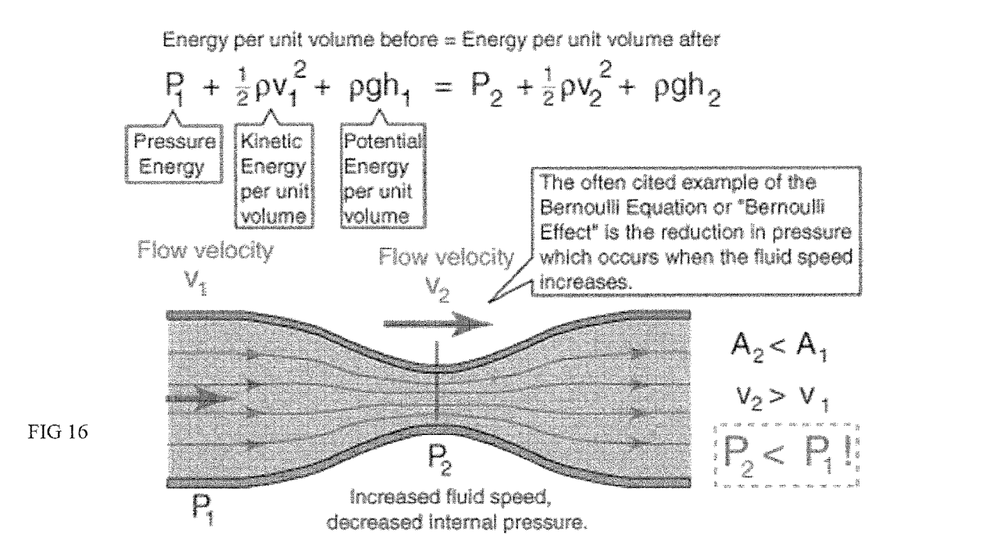
FIG. 16 illustrates the Bernoulli theorem which is used in the present invention.

By applying Bernoulli's principle as illustrated in FIG. 16, the water heater 10 a schematically illustrated in FIG. 15 (which shows the location where pressures P1 and P2 are measured) will maintain the pressure P2 at the exit of the upper portion 20.3 of the flue so as to be less than the pressure P1 measured at the middle chamber 22. The pressure difference between P1 and P2 creates a driving force to assist in the expulsion of flue gases through the upper chamber 24 via the exhaust grilles 24.6. This driving force is maintained regardless of the magnitude of the wind speed or its direction and the pressure exerted on the water heater and flue terminal.

The water heater 10 has its component systems work either independently or in combination to generate the pressure difference (P1–P2) for the operation of the water heater.

Figure 11:
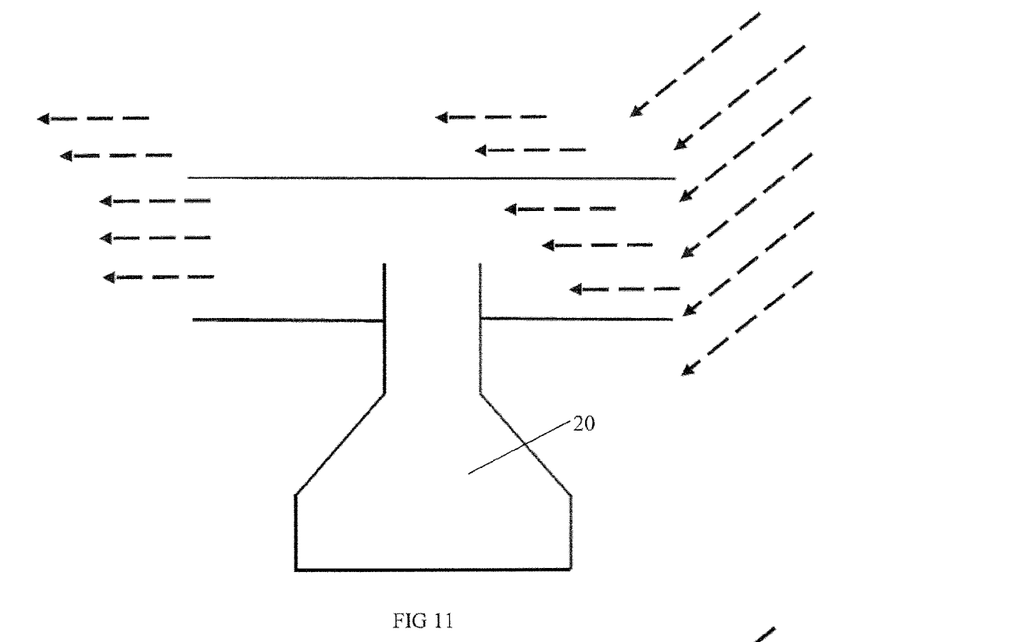
FIG. 11 illustrates schematic view showing the effect of wind on prior art exhaust flues.
Figure 12:
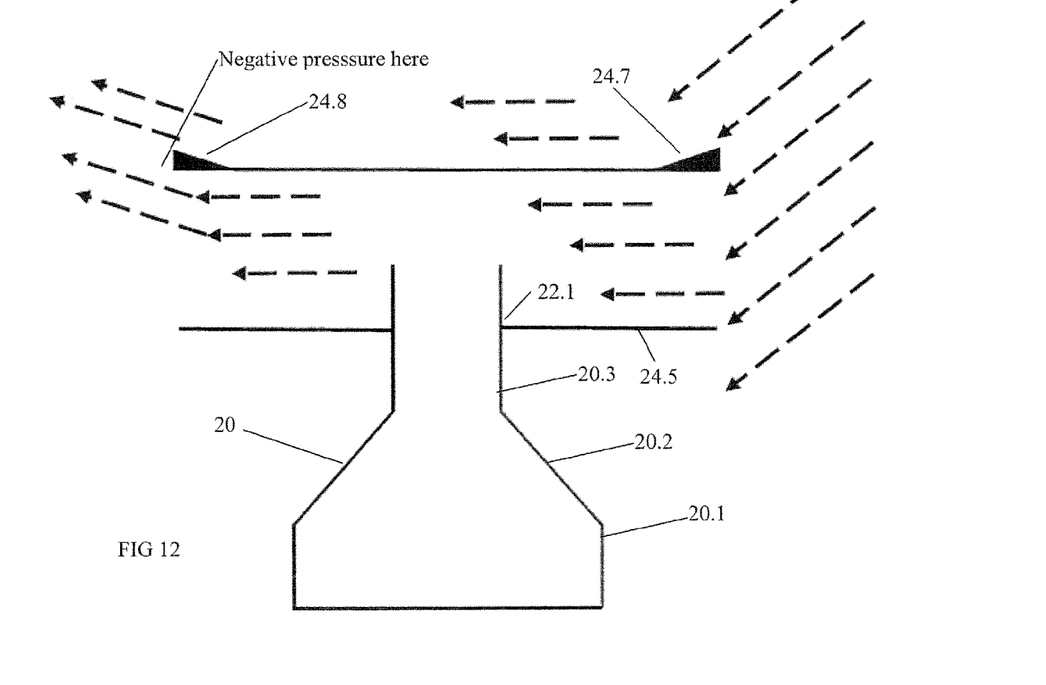
FIG. 12 Illustrates a schematic view showing the effect of wind on the arrangement of the present invention.

These component systems can be described as follows:

The exhaust grilles 24.6 are such that the wind pressure, that is the total pressure energy, which is immediately outside the fluid flow control boundary (i.e. outside the external perimeter or envelope of the flue terminal) is identical at the exhaust grilles 24.6 and inlet air grilles 22.6. The exhaust grille 24.6 operates with a lower resistance by virtue of the surface area provided, in comparison to the system inside middle chamber 22. The air stream travelling through the upper chamber 24 will not be slowed down. This maintains a high air stream velocity head at P2 and low static pressure head at P2. In the preferred embodiment as shown the exhaust grille 24.6 is constructed as a flat-blade louver. This construction also helps to "straighten" the air stream entering into the upper chamber 24 to an essentially horizontal direction air flow as best illustrated in FIGS. 11 and 12 in relation to the vertical exit direction of flue gases from the upper portion 20.3 of the flue 20. Thus reduces the direct impact of a cross flowing air stream on the upper portion 20.3 of the flue duct 20.

The flat-blade or louvered construction of the exhaust grille can be replaced by a rounded-edge or aerofoil-shape grille elements, in order to further reduce flow resistance.

Another alternative is that the grilles 24.6 can be constructed from a flat panels with an array or series of punched holes (of various shapes and or patterns), or by using mesh or wire depending on an aesthetic requirement. In the water heater 10 of the Figures, the exhaust grilles 24.6 are located on the right and left hand side apertures 24.2 and 24.3 only. If required, additional exhaust openings could be formed on the front or rear faces of upper chamber 24, but if provided it would be expected these would also need to be closed by appropriate grilles.

The middle chamber 22 has inlet air grilles 22.6, which in addition to the exhaust grilles 24.6 described above, are such that the effect of the component arrangement in the middle chamber 22 and lower chamber 12 reduce air flow velocity, thus the velocity head at P1 is low but static pressure head at P1 is higher. Similar to the exhaust grilles 24.6, the flat-blade louver which is illustrated can be replaced with different alternative constructions, such as those described in the previous paragraph. A wire mesh grille 22.6 can provide a greater opening area as compared to a flat-blade or louver design. A wire mesh design grille 22.6, due to greater effective opening size, which encourages more air to be entrained into the middle chamber.

Figure 13:
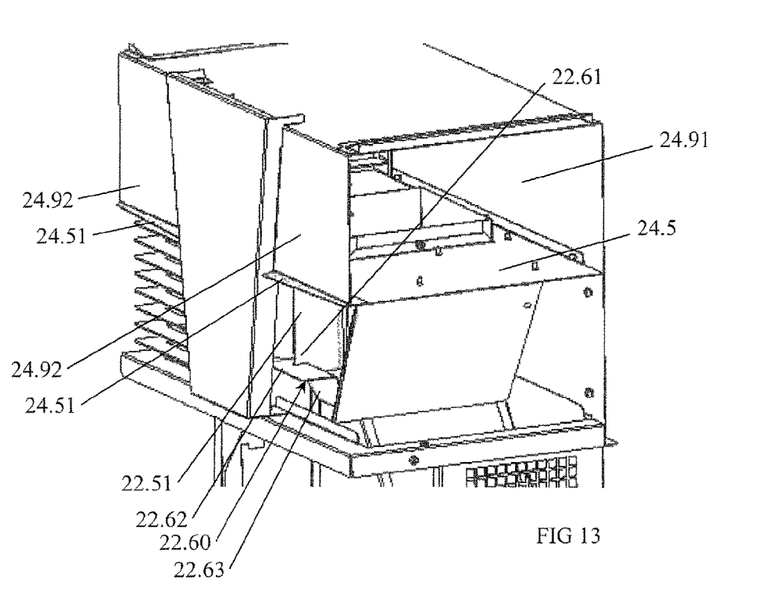
FIG. 13 illustrates an upper perspective view of a further embodiment where the grilles on the upper and middle chamber are removed so as to illustrate additional baffles and plates.

Vertical front and rear dividers 22.1 and 22.2 separate the middle chamber 22 into the left and right hand side sections. The dividers 22.1 and 22.2 extended past the middle chamber 22 and into the lower chamber 12 to maximize the effectiveness. In the event of winds from the sides or corner, the dividers 22.1 and 22.2 prevent air entering into the middle chamber 22 from leaving through the leeward side, thereby preventing a direct line-of sight air path. The dividers 22.1 and 22.2 work in co-operation with other components to channel air from one side of the middle chamber 22, distributing air downwardly into lower chamber 12, so as to supply air for combustion, and releases any excess air through the opposite side of middle chamber 22, as is best illustrated in FIG. 13. Air flow must travel through the lower chamber 12 before leaving. The velocity of air entering via middle chamber 22 will be slowed down which will in turn create a static pressure in the middle chamber 22 and lower chamber 12. Since the lower chamber 12 is substantially sealed, the pressure head generated will be maintained. P1 will be greater than P2. At the leeward side of the water heater 10, a negative pressure field will be developed. Therefore, this suction or negative pressure can promote air to pass through from one side of middle chamber 22, enter into lower chamber 12, then to leave from the other side of middle chamber 22.

Side diffusers 22.4 and 22.5 and front wind diffusers 22.3 provide air flow direction control means so as to channel air into the lower chamber 12 when wind is coming from side and front wind directions. Each diffuser 22.4, 22.5 and respective diffuser 22.3 is secured to the under surface of the panel 24.5, by any appropriate means such as screws pop rivets or adhesive. Additionally the diffusers 22.3 are also secured to the inboard surfaces of the diffusers 22.4 and 22.5 respectively. Although diffusers 22.3, 22.4 and 22.5 are illustrated as being connected to the panel 24.5, it will be readily understood that they can be secured instead to the flue or could even be secured to the respective grilles 22.6.

Each diffuser 22.4, 22.5 and respective diffuser 22.3 while being located and or oriented so as to interact with a specific wind direction will not obstruct air flow from another or different wind direction. The front wind diffusers 22.3 are respectively situated behind or inboard of a respective side wind diffusers 22.4 and 22.5, so that the respective diffuser 22.3 does not obstruct the movement of air from the sides.

At the same time, side winds or moving air is allowed to reach the rear side of upper portion 20.3 of the flue duct 20, the portion situated in the middle chamber 12, which side moving air will be deflected downward by the vertical rear divider 22.2. Air pressure thus building up at this local area can encourage excess air to escape through the front via the channel formed between the back face of side diffusers 22.4 and 22.5 and of upper portion 20.3 of the flue duct 20.

The presence of front diffusers 22.3 assists to control the amount of such leakage. When viewed from the front of the water heater 10, the side diffusers 22.4 and 22.5 form two air channels: a first or inner air channel 22.8 is formed between the side of the upper portion 20.3 of the flue duct 20 and side diffusers 22.4 and 22.5 (see FIG. 3); and a second channel 22.9 is formed between a respective inlet air grille 22.6 and a corresponding side diffusers 22.4 and 22.5, so that some leakage may occur through the side of the inlet air grille 22.6.

When subjected to a front directed wind or moving air, as the front diffusers 22.3 have a rearwardly and downwardly sloping surfaces, part of the air stream entering into the first or inner air channel 22.8 is guided to distribute to the rear part of the water heater 10. Air stream travelling in the second air channel 22.9 forms an air curtain or air envelope to retain the air stream profile of inner air stream in its preferred direction. As the pressure P1 generated in these arrangements for side and front wind directions is larger than P2, this will mean that air will be transported or will move into the lower chamber 12 from any available perimeter openings between the middle chamber 22 and lower chamber 12.

To also assist with the control of wind coming from a front to rear direction, the upper rim 14.3 of the cabinet 14 includes two diverters or baffles 14.4 at a front peripheral location of the cabinet. The baffles 14.4 are located directly in front of the front diffusers 22.3, and assist in controlling the amount of air entering into the middle chamber 22 and directed into the lower chamber 12.

Oppositely directed air deflectors or top air diffusers 24.8 and 24.7, are located on the top panel or plate 24.9 along the upper edge of the openings 24.2 and 24.3 which are the exit edges of the flues gas outlets. The water heater 10 of the Figures utilises an inclined flat-blade design, which is at an angle in the range of 10 to 45 degrees to the horizontal, but most preferably in the range of 20 to 30 degrees to the horizontal, and the angle may be to some extent selected according to reasons of aesthetics and ease of manufacturing. The air deflectors 24.8 and 24.7 can be manufactured from other different shapes, such as aerofoil shapes or forms, so as to achieve the intended aerodynamic effect. Air deflectors similar to air deflectors 24.8 and 24.7 can also be applied along the vertical edges of the flue gases outlets which are defined by the openings 24.2 and 24.3.

When subjected to substantially side directed wind (it is not necessary to be blowing solely or directly from only the side) and/or at an angle inclined from horizontal, air deflectors or top air diffusers 24.8 and 24.7 creates a stronger local negative pressure, as illustrated in FIG. 12, when the air stream leaves from the edge of the air deflectors or top air diffusers 24.8 and 24.7. This increases the pressure difference between the exit edge of the openings 24.3 and P2, and hence improves the driving force to remove flue gases from the combustion system and or flue 20. In otherwise adverse wind angles, that is adverse to prior art systems, the air deflectors or top air diffusers 24.8 and 24.7 actually improve combustion performance to be within the limits allowed in Australian standards.

A front air tunnel or duct 30 is manufactured from a cowling 30.1 which is generally downwardly converging or tapering, and relatively shallow in a front to rear direction. As best seen in FIG. 2, the upper rim 30.2 of the cowling 30.1 sits a short distance, of the order of 5 to 10 mm above the upper surface of upper panel 24.9, but generally within the vertical envelope provided by the upper edges of the air deflectors 24.7 and 24.8. The actual duct, that is an air passage, is formed between the internal surfaces of the cowling 30.1 and the external surfaces of the closed wall 24.92, with the duct 30 being split in two by an upper diverter 22.11, as will be described below. It will be seen from FIG. 3, that the cowling 30.1 has an upper cut-out section 30.3 into which can be received the height of the side wall 24.92. The cowling 30.1 also includes a lower rearwardly directed leg 30.4, which will assist in assembling the lower edge of the cowling 30.1 to the upper rim 14.3 of the cabinet 14.

The front air tunnel or duct 30 assists the water heater 10 to control air flow in relation to specific wind directions which maintains P1 larger than P2. The water heater 10 of the Figures has the front duct 30 which is of a downwardly narrowing cowling which in cross section is channel shaped with side walls perpendicular to the front wall, and interacts with or cooperates with a middle divider portion 22.11 which is formed at the upper part of the vertical front divider 22.1 described above. It can be in other forms, shapes or built as multiple air tunnels. The front duct 30 together with the forward outer wall of the upper chamber 24.92 form a duct which can conduct air from above the upper chamber 24 to the middle chamber 22.

The front duct 30 provides a positive air supply to the middle chamber 22. In the situation where top directed wind or moving air (only a component in this direction is required, that is it does not need to be only downwardly directed), the wind or air stream will form an envelope or curtain around the flue duct 30, front face 24.92 and side openings 24.2 & 24.3, which will send combustion gases and air towards the inlet air grille 22.6. This will cause disadvantages if drawn into the lower chamber 12 for combustion. However, by the front duct 30 being present a positive (driven by the magnitude of wind) and clean air supply (not having entrained flue gases) is delivered to the middle chamber 22. Thus the front duct 30 ameliorates bad combustion conditions in top down wind or moving air is present.

The front duct 30 also assists in wind or moving air escape control. This occurs because in side wind conditions, a portion of wind reaching the vertical front divider 22.1 would readily exit the middle chamber 22 through a front grille. Whereas the presence of the front duct 30 assists to redirect air engaging the divider 22.1 in the middle chamber 22, into a useful direction, that is, to the lower chamber 12.

The front duct 30 also assists in backflow control. This occurs because in the event of front head-on wind, backflow exists when pressure P2 is larger than P1. If the water heater 10 operates in a reverse or back flow direction, namely, that part of flue gases can flow downward towards the burner 16, this will cause improper combustion, could damage water heater components or may present a fire hazard. Thus, by ensuring that the size of the front duct 30 together with the front air diffusers 22.8 is selected so that there is no direct air flow path for the air stream entering the inlet air grilles 22.6 from the front portion from passing through the side portion of the grilles 22.6, and thus leaving the fluid flow control boundary or perimeter of the flue terminal. Otherwise, the pressure head at P1 will be low as there is no means to convert the air velocity head to pressure head.

As best illustrated in FIGS. 1 and 2, the water heater 10 can include side openings 40. The side openings 40 are a supplementary means to provide air into the lower chamber 12. The side openings 40 are a series of apertures in the cabinet side walls at the upper reaches of the lower chamber 12. Similar apertures can be positioned through the front cover 14.2 which closes off the lower chamber 12. In the case of top-side wind situations, the side openings 40 can provide direct entry of air (which is less polluted by flue gases) into the lower chamber 12 and is prevented from leaving through the middle chamber 22. The side openings 40 are not located near the bottom half of the lower chamber 12 as this would compromise the substantially sealed nature or construction of lower chamber 12 which assists the air flow strategies employed in the water heater 10.

Positive control of air flow within the water heater 10 by means of various systems described above assists to provide stability of water heater operation under various wind conditions, reduces improper combustion issues which can be experienced by prior art natural draught water heater arrangements.

Figure 4:
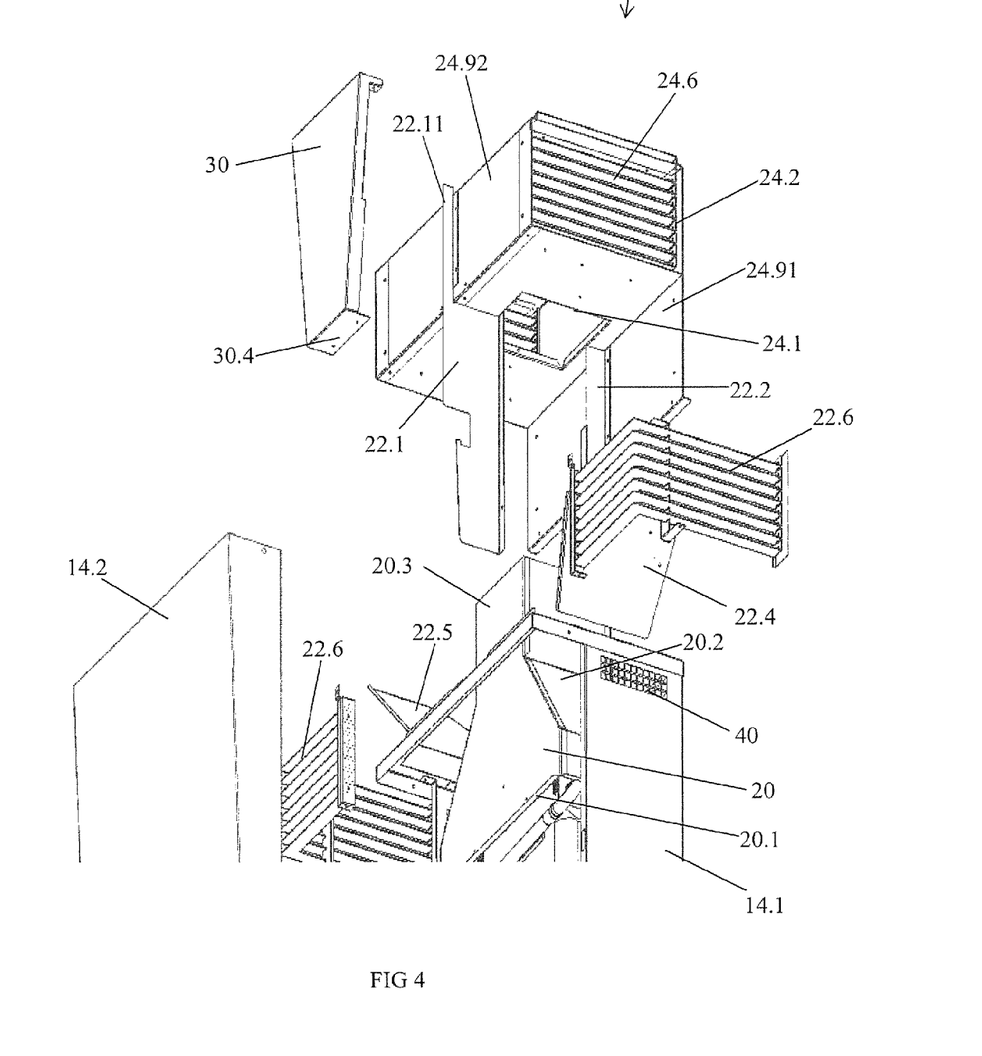
FIG. 4 illustrates an exploded lower perspective view of the components of FIG. 3.
Figure 5:
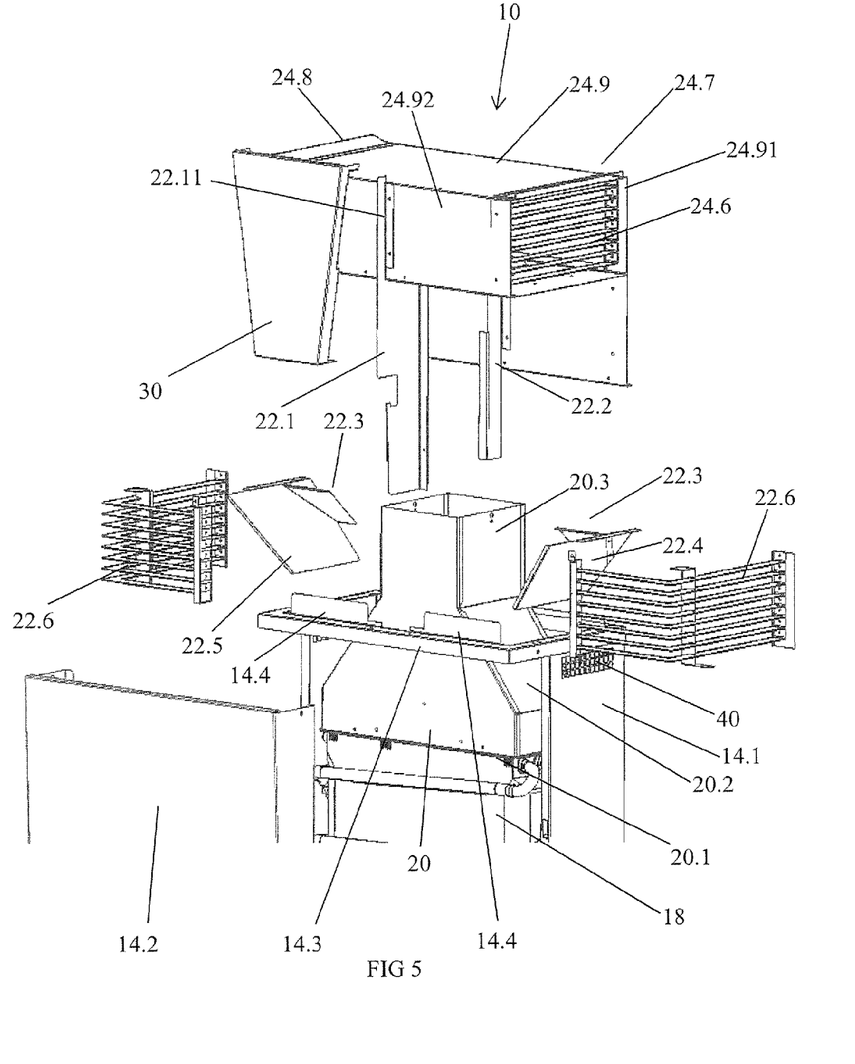
FIG. 5 illustrates a side perspective view of the components of FIG. 3.

In the above embodiment and illustrated in the FIGS. 3 to 5, the baffles or dividers 22.1 and 22.11 and 22.2 are shown as being manufactured and or assembled to the side walls of the upper and middle chambers 24 and 22 and attached to the side of the flue 20. If desired such diverters or baffles 22.1 and 22.11 and 22.2 can be manufactured as part of, and or assembled to, respectively the front and rear sides of the flue 20, and which terminate at a wall of the cabinet or the respective chamber. Further such baffles or dividers 22.1 and 22.11 and 22.2 are illustrated as being of a single piece construction, however it will be understood a multi-piece construction could also be utilised.

The length of downward extension of the dividers 22.1 and 22.2 are shown in FIGS. 6, 3 and 5, to extend to the very base of the flue 20, that is, to the base rim 20.1 of the flue 20. It will be understood that this length of downward extension of the dividers 22.1 & 22.2 can be varied according to design or operational needs of the water heater or the weather conditions which prevail in specific locations. The extent of downward extension required is to produce the effect of having outside air move into the lower chamber 12, before exiting, and such air not having a straight or line of sight flow path directly out from one side of the chamber 22 to the other side.

The material selection for the components described above can be as appropriate to the conditions and mechanical property requirements and design criteria. However, in an embodiments described above the heat exchanger can be made of copper or copper sheet metal only, whereas for other components, such as the internal diverters or baffles 22.1, 22.11 and 22.2, the flue 20, and the housing or cabinet, then steel sheet metal with an external powder coating is used. Such sheet metal can be 0.8 mm galvanised steel (e.g. Galvabond), but the thickness can vary in a production model according to the mechanical properties sought by the design criteria, or use or environment in which the water heater 10 may be required, and possibly even upon the availability and or price of the steel sheet metal available during production runs. Thus 0.8, 1 mm or other appropriate thickness of zinc coated steel sheet material can be utilised as required.

Figure 14:
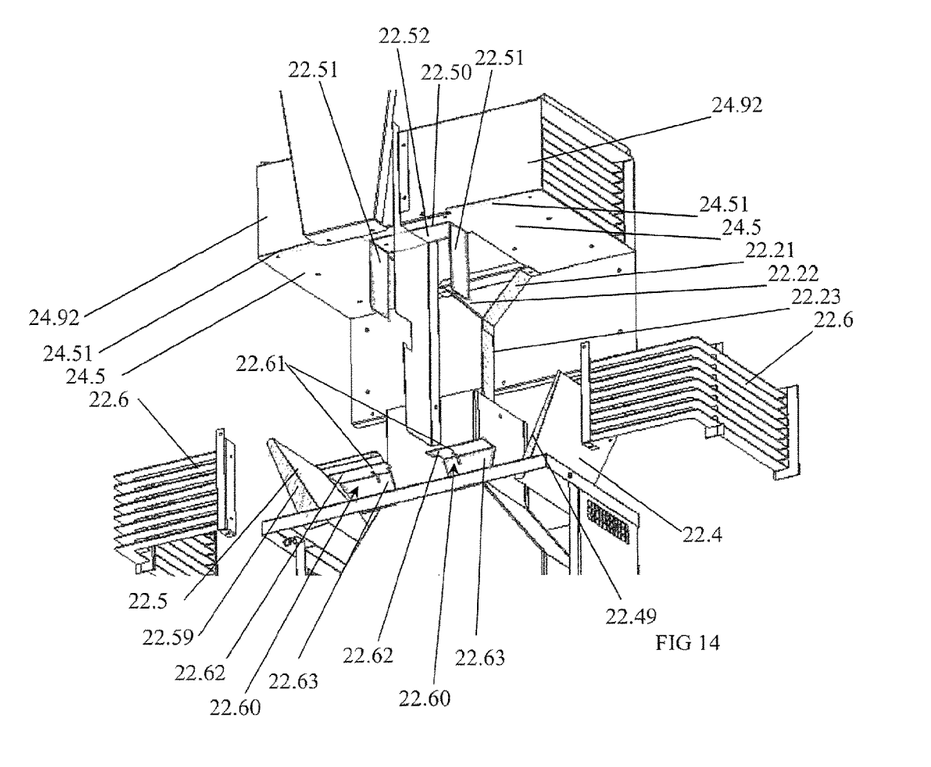
FIG. 14 illustrates an exploded lower perspective view of the components of FIG. 13.

Illustrated in FIGS. 13 and 14 is another embodiment of flue arrangement, similar to previous Figures, with like parts being like numbered. The difference between the embodiment of FIGS. 13 and 14 and previous Figures is the presence of additional and or changed baffle configurations to attempt to improve the water heating unit's performance.

In FIGS. 13 and 14 it can be seen that the lower wall 24.5 of the upper chamber 24 has a forward extension piece 24.51. The extension piece is of a generally trapezoidal shape which extends away from the intersection of the base of the front side wall 24.92 and the lower wall 24.5. The extension pieces 24.51 are shaped so as to assist in preventing flue gas exiting the upper chamber 24 through the grilles 24.6 from polluting or degrading the air which will enter the middle chamber 22 through the grilles 22.6. This may happen in a situation where a downward and sideward air flow maybe present at a low speed.

Another improvement is the provision of two internally located baffles 22.51, each having a generally vertical orientation, which are provided as part of a generally U-shaped component 22.50, where the cross piece 22.52 is secured to the lower surface of the lower wall 24.5, so that the baffles 22.51 will extend downwardly into the middle chamber 22. The baffles 22.51 enhance the effectiveness of the air channelling and flow paths at the front of the water heating unit, so air can be better channelled to the lower chamber 12.

The vertical baffles 22.51 have their bases located inside a slit 22.61 of a lower located baffle 22.60. The baffle 22.60 has a horizontal portion 22.62 extending forwardly from a rear located inclined portion 22.63. The baffle 22.60 assists the operation of the flue arrangement by ensuring air passing below the horizontal portion 22.62 and which enters from the front of grilles 22.6 and will progress immediately downwardly, while the air passing in but over the horizontal 22.62 will progress further into the middle chamber 24 and then downwardly.

The side diffusers 22.4 and 22.5 of FIGS. 13 and 14 are different to the side diffusers 22.4 and 22.5 of other Figures, in that they include side panels 22.49 and 22.59, so that frontward moving air contacting side diffusers 22.4 and 22.5 will be directed downwardly into the lower chamber 12. It will be noted that the side panels 22.49 and 22.59 taper so that their lower end are of greater width than their upper ends, so as to minimise spillage of a greater volume of frontward moving air at the lower end than at the upper end. Such side panels 22.49 and 22.59 are not needed on the rearward edges of the diffuser 22.4 and 22.5 as the rear wall 24.9 will direct air downward.

In the embodiment of FIGS. 13 and 14, as best seen from FIG. 14, the vertical rear divider 22.2 is modified from being a generally vertical straight baffle of FIGS. 1 to 12, to a generally Y-shaped baffle 22.2 having upper inclined portions 22.21 and 22.22 and a vertical straight lower portion 22.23. The inclined upper portions 22.21 and 22.22 have their lower ends inboard while their upper ends are outboard, so that sideways travelling or moving air will be directed downwards through the middle chamber 22 towards the lower chamber 12. The baffle 22.2 is secured at its upper end to the lower rear side of the lower panel 24.5. The arrangement of the baffle 22.2 provides enhancement over the previous embodiments particularly with respect to side moving air.

For additional strength, the various brackets, such as hanging brackets 14.33, and the louvers or grilles 22.6, 24.6 and the like, are preferably made of 1.5 mm galvanised and powder coated sheet steel, but other thicknesses can be selected according to need.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. An outdoor water heater comprising:
a lower chamber located in a cabinet which substantially sealingly encloses a naturally aspirated or natural draught burner;
a combustion chamber;
a heat exchanger; and
a flue for conveying combustion gases from said burner;
said flue extending away from said heat exchanger and passing through a middle chamber located above said lower chamber,
said flue not opening into said middle chamber and opening into an upper chamber which has two opposed openings,
said upper chamber and middle chamber being substantially sealed with respect to each other to prevent combustion gas flow between said middle chamber and said upper chamber, and
wherein said middle chamber has divider formations separating one side of said middle chamber from an opposed side of said middle chamber, whereby said divider formations direct air flowing from one side of the middle chamber to pass downwardly into said lower chamber on one side then upwardly out of said lower chamber to exit said middle chamber on the other or opposite side.

2. The water heater as in claim 1, wherein said divider formations terminate against the flue.

3. The water heater as in claim 1, wherein flow directing formations are located at the sides of said middle chamber.

4. The water heater as in claim 1, wherein flow directing formations are located at the sides of said flue.

5. The water heater as in claim 1, wherein flow directing formations are located inside of said middle chamber.

6. The water heater as in claim 3, wherein each said flow directing formation comprises one or more than one of the following:
an inclined plate or panel;
a plate or panel where the upper edge thereof is in an upper outboard location when compared to a lower edge thereof which is located in a lower inboard location with respect to outer sides of said cabinet;
a plate or panel where the upper edge thereof is in a forward location when compared to a lower edge thereof which is located at a rearward location with respect to said cabinet; and
plates or panels which are inclined with respect to one or more peripheral walls of the cabinet so as to direct air entering from a side of said water heater in a downward direction from said middle chamber to said lower chamber.

7. The water heater as in claim 1, wherein top, front and rear sides of said upper chamber are closed surfaces.

8. The water heater as in claim 1, wherein a rear side of said middle chamber is a closed surface.

9. The water heater as in claim 1, wherein said opposed openings are partially closed by means of a grille.

10. The water heater as in claim 1, wherein said middle chamber, at an outer periphery thereof, is partially closed by means of a grille.

11. The water heater as in claim 9, wherein said grille is one of the following: a louvered grille; a grille of horizontal rods or bars; a grille of horizontally oriented louvers; a grille of vertically oriented rods or bars; a grille of vertically oriented louvers; a grille of mesh material.

12. The water heater as in claim 2, wherein said divider formations extend to a base of said flue.

13. The water heater as in claim 1, wherein a duct is located at a front surface of said upper and middle chambers.

14. The water heater as in claim 13, wherein said duct is one or more than one of the following: is vertically extending; has a generally horizontal upper opening; has an upper opening above an upper plate of the upper chamber; has a generally vertical lower opening; has an internal divider along a substantial part of a vertical length of the duct; the duct converges in a downward direction.

15. The water heater as in claim 13, wherein said duct conducts air from above said upper chamber to said middle chamber.

16. The water heater as in claim 13, wherein said duct has a vertically arranged centrally located divider, wherein one side thereof opens into said middle chamber on one side of the middle chamber, and the other side opens into said middle chamber on the other side of the middle chamber.

17. The water heater as in claim 1, wherein above said opposed openings on an upper panel or plate of said upper chamber, there are located air deflecting formations which extend across a substantial width of the upper edge or surface of the openings.

18. The water heater as in claim 17, wherein said air deflecting formations are at an angle of 45 degrees or less to a plane of the upper panel or plate of the upper chamber.

19. The water heater as in claim 6, wherein said plates or panels include side portions which increase in width from an upper to a lower end of said plates or panels.

20. The water heater as in claim 1, wherein an inclined or horizontal and inclined baffle is located at a forward location of said middle chamber with an upper edge which is located between upper and lower peripheries of said middle chamber.

21. The water heater as in claim 20, wherein air passing over the upper edge of said baffle, will travel horizontally into said middle chamber.

22. The water heater as in claim 20, wherein air passing under the upper edge of said baffle will be directed to move downwardly through said middle chamber to said lower chamber.

* * * * *